UNITED STATES PATENT OFFICE.

CHARLES ARNOUDTS, OF GUATEMALA, GUATEMALA.

BLASTING-POWDER.

964,365.　　　　Specification of Letters Patent.　　Patented July 12, 1910.

No Drawing.　　Application filed April 12, 1910.　Serial No. 554,908.

*To all whom it may concern:*

Be it known that I, CHARLES ARNOUDTS, a citizen of the United States, and resident of Guatemala city, Guatemala, have invented certain new and useful Improvements in Blasting-Powder, of which the following is a specification.

The invention has for its object the provision of an explosive mixture that is stable, cheap and efficient for blasting purposes.

The mixture comprises: syrup, consisting of 40 parts of sugar to which have been added 4 parts of water; chlorate of potash 60 parts; permanganate of potash 1/800 part; spirits of turpentine 2 parts; and vegetable tar 2 parts. These ingredients are mixed together while hot to form a plastic dope, which is afterward dried, when it is ready for use.

Having thus described my invention, what I claim and desire to secure by Letters Patent is:

A blasting-powder, comprising a mixture of sugar, chlorate of potash, permanganate of potash, spirits of turpentine, and vegetable tar.

In testimony whereof I affix my signature in presence of two subscribing witnesses.

CHARLES ARNOUDTS.

Witnesses:
　CHAS. J. O'NEILL,
　ARTHUR L. BRYANT.